United States Patent
Morikawa

(10) Patent No.: US 11,865,754 B2
(45) Date of Patent: Jan. 9, 2024

(54) MOLDING MATERIAL SUPPLY DEVICE AND MOLDING MATERIAL SUPPLY METHOD

(71) Applicant: Sodick Co., Ltd., Kanagawa (JP)

(72) Inventor: Tadashi Morikawa, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 537 days.

(21) Appl. No.: 17/184,551

(22) Filed: Feb. 24, 2021

(65) Prior Publication Data

US 2021/0260801 A1    Aug. 26, 2021

(30) Foreign Application Priority Data

Feb. 26, 2020   (JP) ................................ 2020-030075

(51) Int. Cl.
*B29C 45/54*   (2006.01)
*B29C 45/63*   (2006.01)
*B29K 83/00*   (2006.01)

(52) U.S. Cl.
CPC .............. *B29C 45/54* (2013.01); *B29C 45/63* (2013.01); *B29K 2083/00* (2013.01)

(58) Field of Classification Search
CPC ..... B29C 45/54; B29C 45/63; B29C 45/0001; B29C 45/77; B29C 45/586; B29C 45/531; B29K 2083/00
See application file for complete search history.

(56) References Cited

U.S. PATENT DOCUMENTS

| | | | | |
|---|---|---|---|---|
| 6,468,464 | B1* | 10/2002 | Eckardt | B29C 45/54 425/557 |
| 2002/0068104 | A1* | 6/2002 | Asano | B29C 45/76 425/130 |
| 2005/0056978 | A1* | 3/2005 | Fujikawa | B22D 17/2015 266/200 |
| 2005/0161847 | A1* | 7/2005 | Weatherall | B29C 45/77 425/145 |
| 2021/0129402 | A1 | 5/2021 | Yokoyama | |

FOREIGN PATENT DOCUMENTS

JP    6728462    7/2020

* cited by examiner

*Primary Examiner* — Vishal Pancholi
*Assistant Examiner* — Robert K Nichols, II
(74) *Attorney, Agent, or Firm* — JCIPRNET

(57) ABSTRACT

A molding material supply device and a molding material supply method capable of supplying a degassed molding material to a molding apparatus at a desired timing are desired. According to the molding material supply device and method of the disclosure, a first discharge member is driven to discharge a molding material accommodated in a first accommodation member to a second discharge member through a through hole of a die, and a second discharge member configured by the first accommodation member and the die advances to discharge the molding material having been degassed in the second accommodation member to the molding apparatus from a molding material supply port.

14 Claims, 15 Drawing Sheets

MOLDING MATERIAL SUPPLY DEVICE AND MOLDING MATERIAL SUPPLY METHOD

CROSS-REFERENCE TO RELATED APPLICATION

This application claims the priority benefit of Japan application serial no. 2020-030075, filed on Feb. 26, 2020. The entirety of the above-mentioned patent application is hereby incorporated by reference herein and made a part of this specification.

BACKGROUND

Technical Field

The disclosure relates to a molding material supply device for degassing gas mixed into a molding material and supplying the degassed molding material to a molding apparatus. In addition, the disclosure relates to a molding material supply method for degassing gas mixed into a molding material and supplying the degassed molding material to a molding apparatus.

Description of Related Art

In general, a molding apparatus molds a molding material into a desired shape to obtain a molded article. As examples, the molding apparatus may be an injection molding apparatus, an extrusion molding apparatus, and a blow molding apparatus, etc.

According to an injection device of Patent Document 1 (Japanese Patent No. 6728462), a configuration for degassing a molding material in which gas is mixed before supplying the molding material to the injection device is proposed. The molding material supplied from a material supply part is discharged to a material receiving part through a through hole of a die. The molding material is formed to be thread-like or belt-like, etc., by passing through the through hole of the die, and then passes through the material receiving part and is supplied to a material supply port formed in the injection device. In the molding material formed to be thread-like or belt-like, etc., gas, such as air, mixed in the molding material may be easily discharged to the outside. In addition, by making the material receiving part a chamber, and decompressing the inside of the chamber by using a decompression device, the gas included in the molding material can be more efficiently degassed.

In the injection device of Patent Document 1, the die is disposed above the material supply port of the device body. The thread-like or belt-like molding material discharged from the die passes through the chamber and drops to the material supply port due to its own weight. At this time, the thread-like or belt-like molding material may be curved in the chamber due to its properties. Due to the viscosity, stickiness, or sliding property of the curved molding material, the curved molding material may be adhered to each other or adhered to the inner wall of the chamber, and temporarily stay in the chamber. It is possible that the molding material is not supplied to the device body at the desired timing.

SUMMARY

The disclosure provides a molding material supply device capable of supplying a degassed molding material to a molding apparatus at a desired timing. Moreover, the disclosure also provides a molding material supply method capable of supplying a degassed molding material to a molding apparatus at a desired timing. Additional objects and advantages of the disclosure will be set forth in the description that follows.

An aspect of the disclosure provides a molding material supply device. The molding material supply device degases gas mixed into a molding material and supplying the degassed molding material to a molding material supply port of a molding apparatus and includes: a first discharge device, a second discharge device, and a control device. The first discharge device includes: a first discharge member, a first discharge driving device, a first accommodation member, and a die. The first discharge driving device drives the first discharge member. The first accommodation member is provided with a first accommodation space accommodating the first discharge member to be able to drive the first discharge member and accommodating the molding material, and provided with a first discharge hole in communication with the first accommodation space and the die. The die is installed to the first discharge hole and is provided with at least one through hole in communication with the first discharge hole and an outside of the first accommodation member. The second discharge device includes: a second discharge member, a second discharge driving device, and a second accommodation member. The second discharge member at least includes the first accommodation member and the die. The second discharge driving device moves the second discharge member back and forth. The second accommodation member is provided with a second accommodation space accommodating the second discharge member to be movable back and forth and accommodating the molding material discharged through the die to a front of the second discharge member, and provided with a second discharge hole in communication with the second accommodation space and the molding material supply port. The control device is connected to the first discharge driving device and the second discharge driving device, controls the first discharge driving device to drive the first discharge member to discharge the molding material in the first accommodation space into the second accommodation space through the die, and controls the second discharge driving device to advance the second discharge member to discharge the molding material having been degassed in the second accommodation space into the molding apparatus from the molding material supply port.

Another aspect of the disclosure provides a molding material supply method. According to the molding material supply method, gas mixed into a molding material is degassed and the degassed molding material is supplied to a molding material supply port of a molding apparatus. The molding material supply method includes: a preparation process in which the molding material is supplied to a first accommodation space of a first accommodation member; a standby process in which a second discharge member at least configured by the first accommodation member and a die and accommodated in a second accommodation space of a second accommodation member to be movable back and forth retreats to a predetermined position with respect to the second accommodation member; a degassing process in which a first discharge member accommodated in the first accommodation space to be drivable is driven to discharge the molding material in the first accommodation space into the second accommodation space and to a front of the second discharge member through a through hole of the die; and a supply process in which the second discharge member advances to discharge the molding material after being degassed from the second accommodation space to the molding material supply port.

DESCRIPTION OF THE EMBODIMENTS

According to the molding material supply device and the molding material supply method according to the embodiments of the disclosure, the molding material can be degassed, and the degassed molding material can be supplied to the molding apparatus at a desired timing.

In the following, the embodiments of the disclosure will be described in detail with reference to FIGS. 1 to 17.

A molding material supply device 1 of the disclosure degases a gas G, such as air, from a molding material S in which the gas G is mixed, and supplies the degassed molding material S to a molding apparatus 100. The molding material supply device 1 is connected to a molding material supply port 101 of the molding apparatus 100. For example, the molding apparatus 100 may be an injection molding apparatus, an extrusion molding apparatus, etc. As another example, the molding apparatus 100 may also include an injection molding apparatus which molds a preform used in blow molding. As yet another example, the molding apparatus 100 may also include an injection molding apparatus or an extrusion molding apparatus which molds a parison or a preform used in blow molding.

The injection molding apparatus includes a mold clamping device, an injection device, and a main control device. A mold m is mounted in the mold clamping device. The mold clamping device (not shown) performs opening and closing as well as mold clamping of the mold m. The injection device is provided with a molding material supply port. The injection device 110 fills the molding material S supplied from the molding material supply port 101 into the mold m. The main control device (not shown) controls the mold clamping device and the injection device 110.

The injection device 110 is of a screw-preplasticating type, an in-line screw type, and a plunger type.

Figure 16:
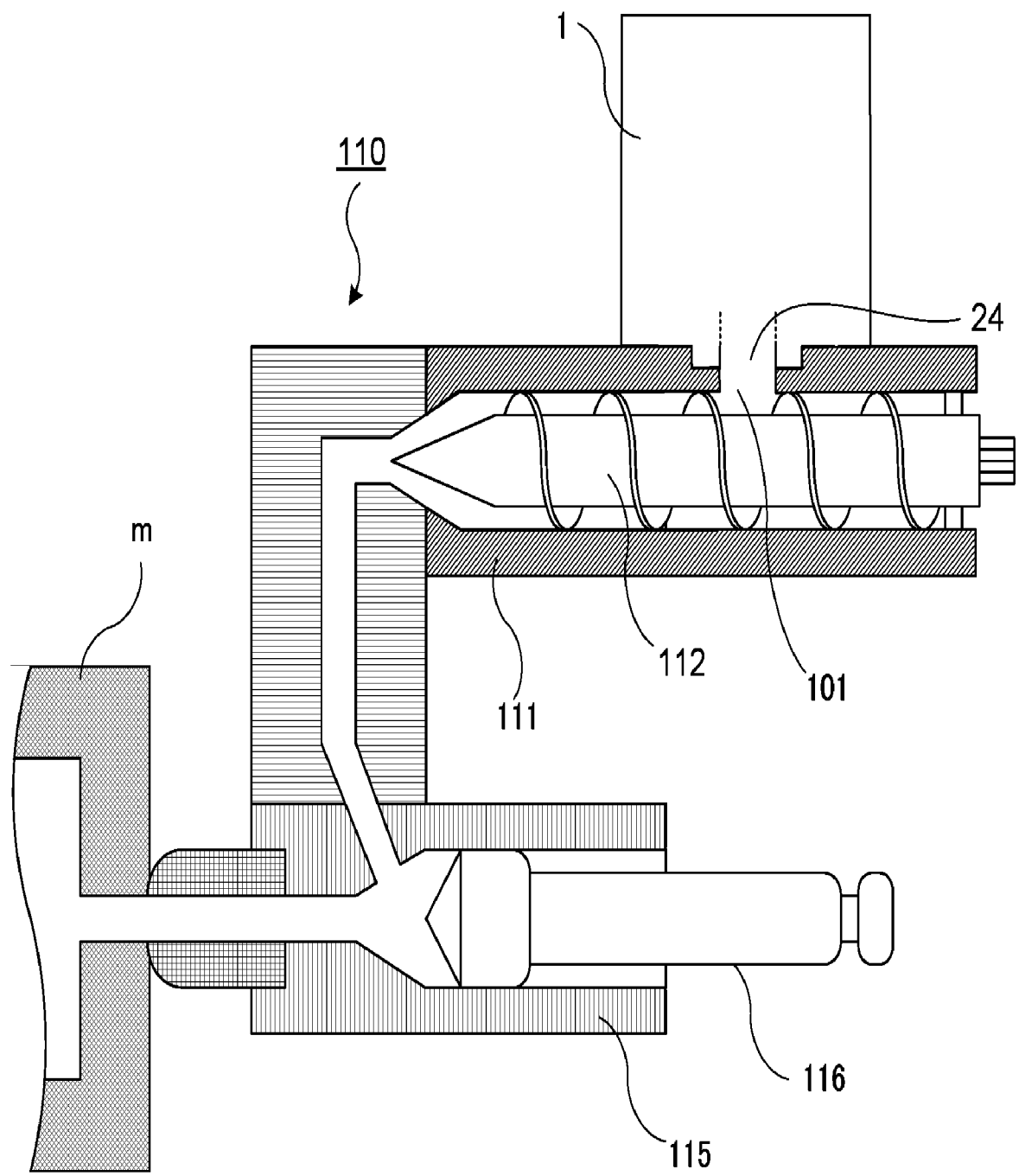
FIG. 16 is a schematic view illustrating a configuration of an injection device of a screw-preplasticating type in which the material supply device according to an embodiment of the disclosure is mounted.

In the injection device 110 of the screw-preplasticating type shown in FIG. 16, the molding material supply port 101 may be formed in a plasticizing cylinder 111. After being supplied into the plasticizing cylinder 111 from the molding material supply port 101, the molding material S is supplied into an injection cylinder 115 by a plasticizing screw 112 rotating in the plasticizing cylinder 110, and is filled into the mold m by an injection plunger 116 advancing in the injection cylinder 115. In addition, the injection device 110 of the screw-preplasticating type may, in place of the plasticizing cylinder 111, include a mixing cylinder (not shown), and may, in place of the plasticizing screw 112, include a mixing screw (not shown). The molding material supply port 101 is formed in the mixing cylinder. After being supplied into the mixing cylinder from the molding material supply port 101, the molding material S is supplied into the injection cylinder 115 by the mixing screw rotating in the mixing cylinder, and is filled into the mold m by the injection plunger 116 advancing in the injection cylinder 115.

In the injection device of the in-line screw type (not shown), the molding material supply port 101 may also be formed in an injection cylinder (not shown). After being supplied into the injection cylinder from the molding material supply port 101, the molding material S is supplied to the front of an in-line screw (not shown), which rotates and retreats in the injection cylinder, and is filled into the mold m by the in-line screw advancing in the injection cylinder.

Figure 17:
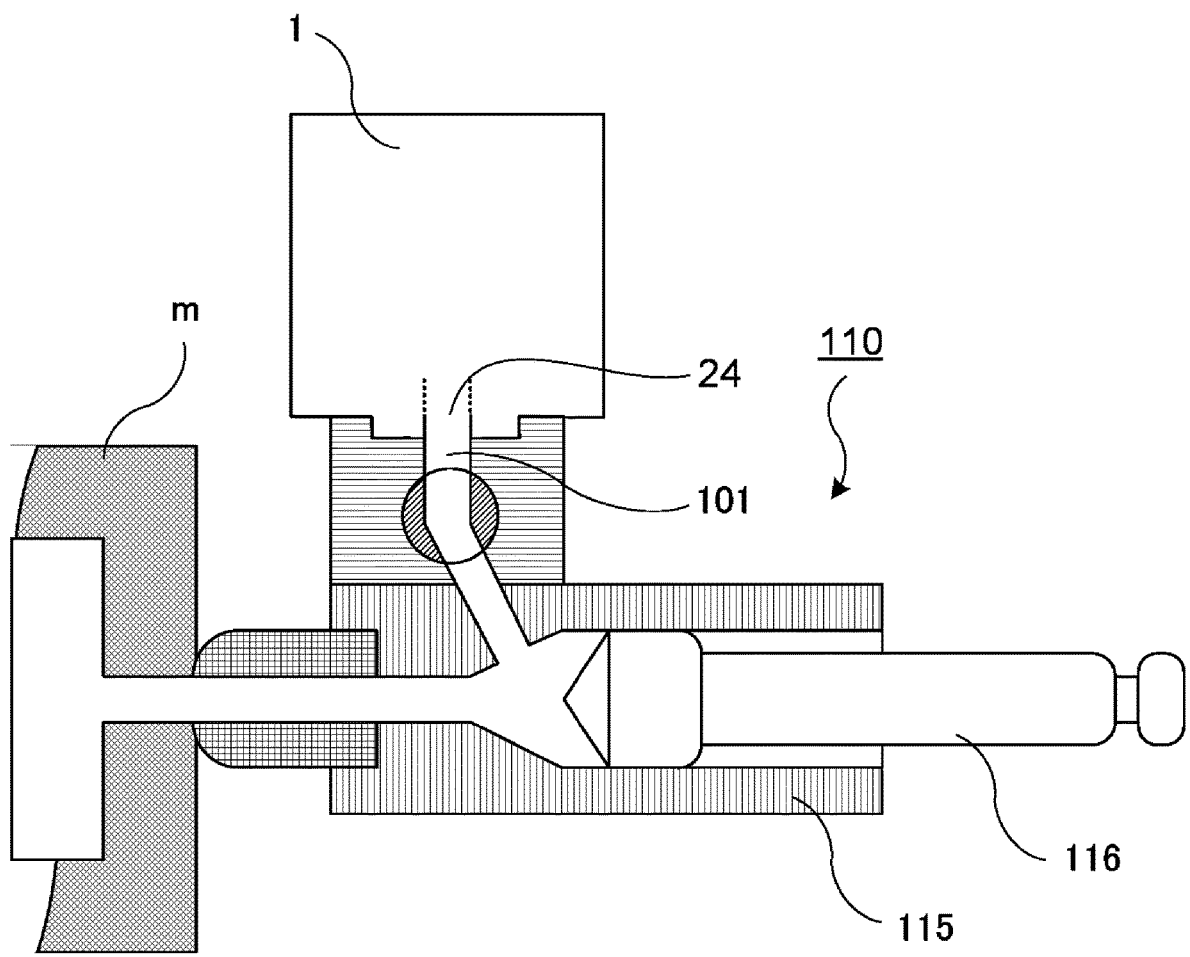
FIG. 17 is a schematic view illustrating a configuration of an injection device of a plunger type in which the material supply device according to an embodiment of the disclosure is mounted.

In the injection device 110 of the plunger type shown in FIG. 17, the molding material supply port 101 is formed in the injection cylinder 115. After being supplied from the molding material supply port 101 into the injection cylinder 115, the molding material S is filled into the mold m by the injection plunger 116 advancing in the injection cylinder 115.

The extrusion molding apparatus (not shown) includes an extrusion device and a main control device. In the extrusion device, the molding material supply port 101 is formed in an extrusion cylinder (not shown). After being supplied into the extrusion cylinder from the molding material supply port 101, the molding material S is extruded through a die (not shown) by an extrusion screw (not shown) rotating in the extrusion cylinder. The main control device controls the extrusion device.

In addition, the extrusion molding apparatus may further include a mold clamping device (not shown). The mold m is mounted in the mold clamping device. The mold clamping device performs opening and closing as well as mold clamping of the mold m. After being supplied from the molding material supply port 101 into the extrusion cylinder, the molding material S may also be filled into the mold m by the extrusion screw rotating in the extrusion cylinder.

In addition, in the extrusion molding apparatus, in place of the extrusion screw, the molding material S may also be extruded by an extrusion plunger (not shown) advancing in the extrusion cylinder.

In the following, the molding material supply device 1 according to the disclosure will be described.

Figure 1:
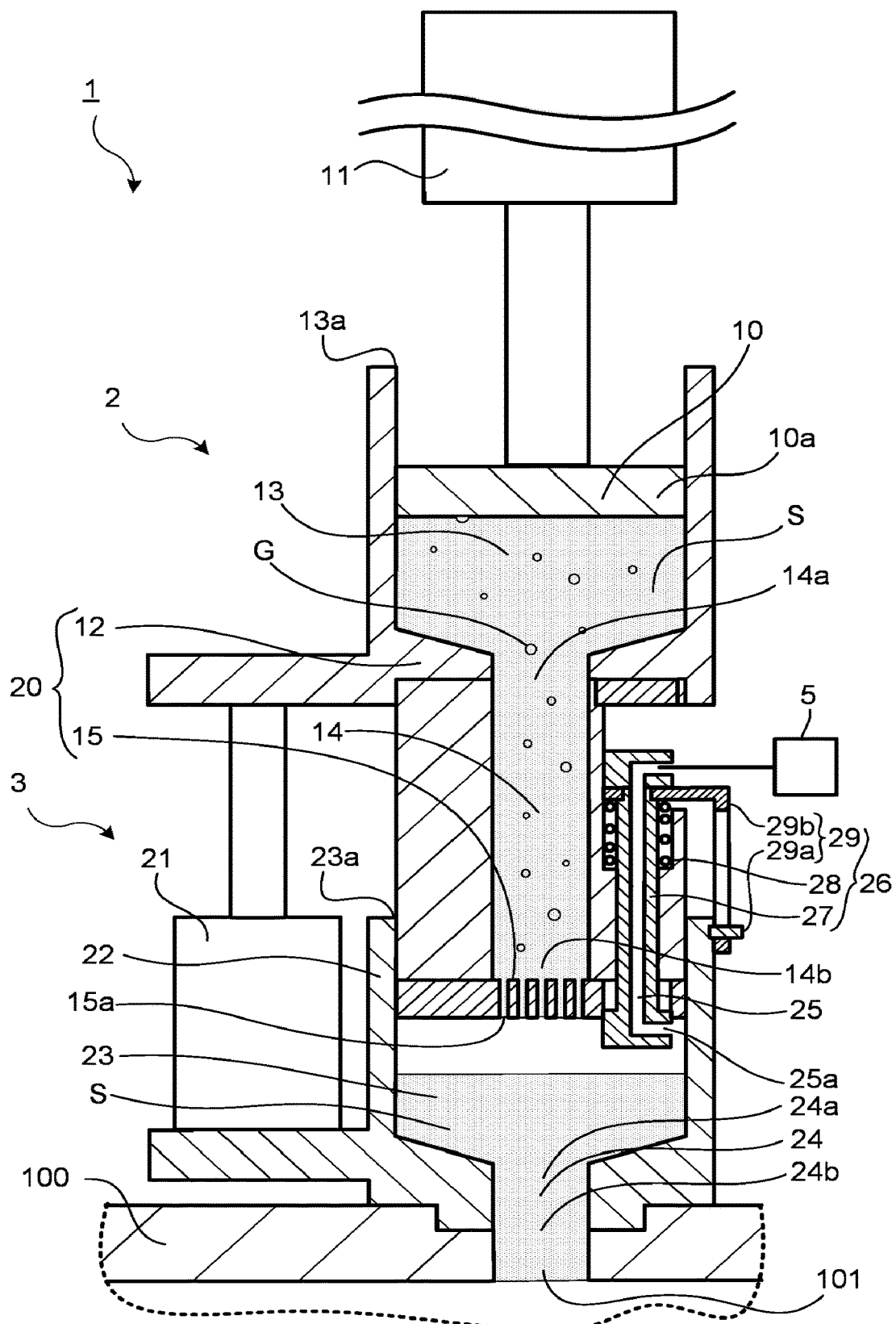
FIG. 1 is a schematic view illustrating a configuration of a molding material supply device according to an embodiment of the disclosure.
Figure 2:
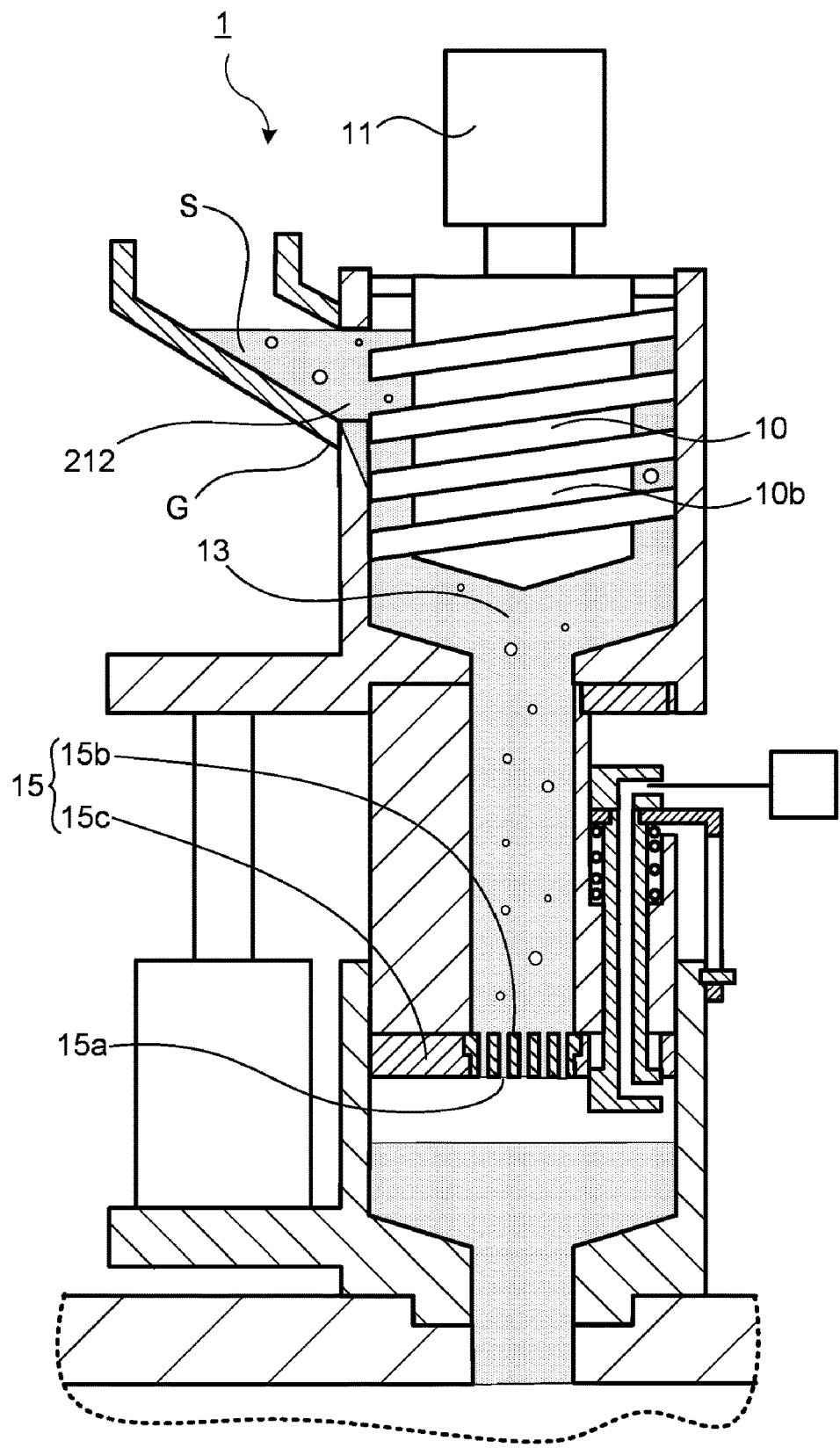
FIG. 2 is a schematic view illustrating a configuration of a molding material supply device according to another embodiment of the disclosure.
Figure 3:
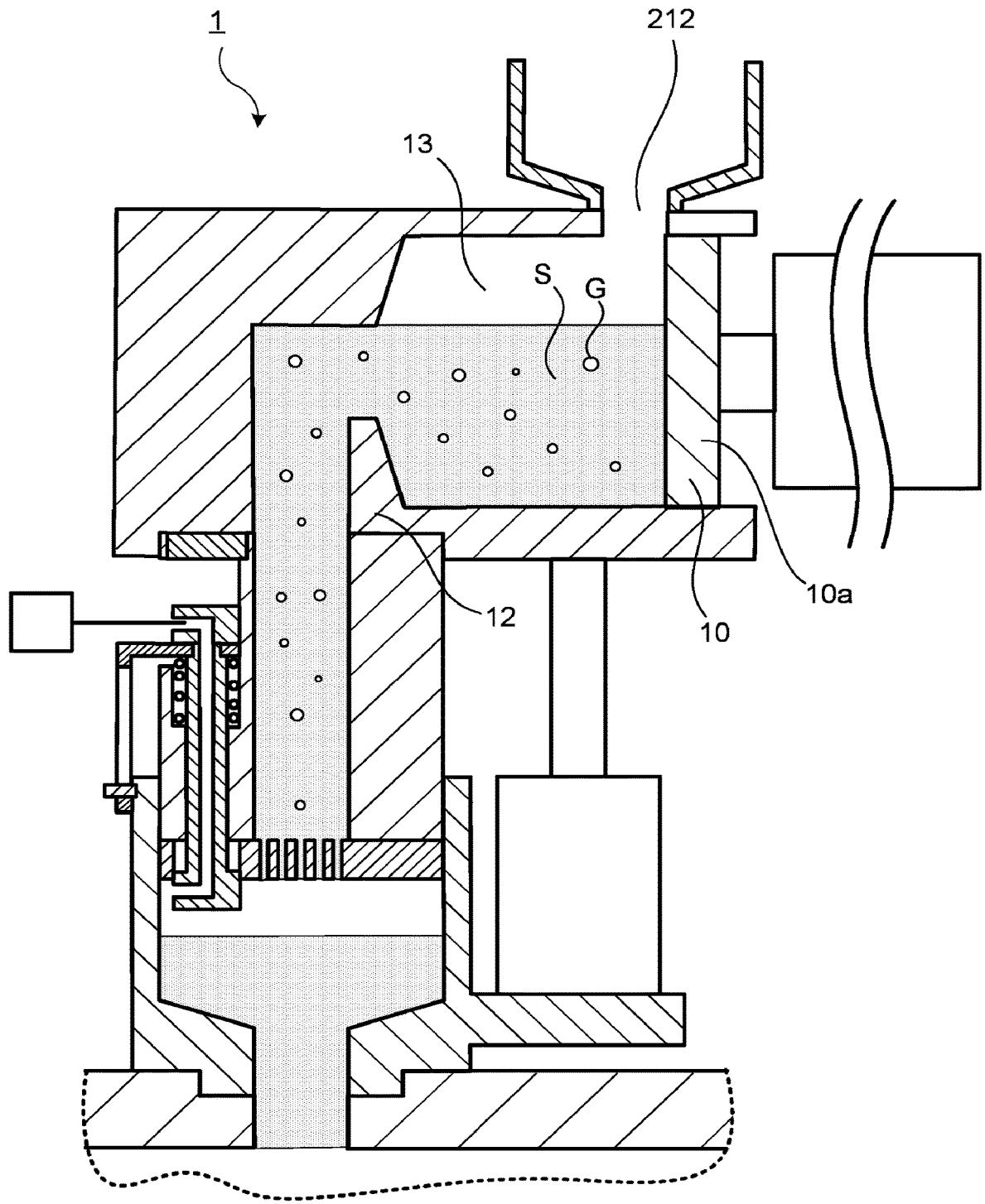
FIG. 3 is a schematic view illustrating a configuration of a molding material supply device according to another embodiment of the disclosure.

The molding material supply device 1 of the disclosure shown in FIGS. 1 to 3 includes a first discharge device 2, a second discharge device 3, and a control device 4.

The first discharge device 2 includes a first discharge member 10, a first discharge driving device 11, a first accommodation member 12, and a die 15.

For example, the first discharge member 10, as shown in FIG. 1, is a plunger 10a accommodated in a first accommodation space 13 described in the following to be movable back and forth. The plunger 10a extrudes the molding material S to the front by advancing. In addition, for example, the first discharge member 10 may also be a screw 10b accommodated in the first accommodation space 13 to be rotatable, as shown in FIG. 2. The screw 10b is provided with a spiral flight and extrudes the molding material S to the front through rotation. In the case of the screw 10b, a supply hole 212 having an opening on the outer periphery of the first accommodation member 12 and in communication with the first accommodation space 13 described in the following is formed, and the molding material S is supplied into the first accommodation space 13 from the supply hole 212.

The first discharge driving device 11 drives the first discharge member 10. If the first discharge member 10 is the plunger 10a, the first discharge driving device 11 moves the plunger back and forth. At this time, the first discharge driving device 11 is, for example, a hydraulic cylinder. If the first discharge member 10 is the screw 10b, the first discharge driving device 11 rotates the screw. At this time, the first discharge driving device 11 is, for example, a hydraulic motor. As long as a necessary propulsion force or a necessary torque can be obtained, various driving sources, such as a hydraulic cylinder, a pneumatic cylinder, a linear motor, an electric motor, a hydraulic motor, or a pneumatic motor, can be adopted as the first discharge driving device 11.

The first accommodation member 12 is provided with the first accommodation space 13 and a first discharge hole 14. The first accommodation member 12 may also be configured by connecting a member in which the first accommodation space 13 is formed and a member in which the first discharge hole 14 is formed.

The first accommodation space 13 accommodates the first discharge member 10 to be drivable. In addition, the first accommodation space 13 accommodates the molding material S supplied from the outside of the molding material supply device 1. By driving the first discharge member 10, the molding material S in the first accommodation space 13 is extruded to the first discharge hole 14.

The first discharge hole 14 is in communication with the first accommodation space 13 and the die 15. An inlet 14a of the first discharge hole 14 is open in the first accommodation space 13. An outlet 14b of the first discharge hole 14 is open to the outside of the first accommodation member 12.

The die 15 is installed to the first discharge hole 14. The die 15 may be installed to cover the outlet 14b of the first discharge hole 14. The die 15 is provided with at least one through hole 15a in communication with the first discharge hole 14 and the outside of the first accommodation member 12. Here, the outside of the first accommodation member 12 is a second accommodation space 23 described in the following. By driving the first discharge member 10, the molding material S in the first accommodation space 13 is extruded to the second accommodation space 23 via the die 15.

Figure 4:
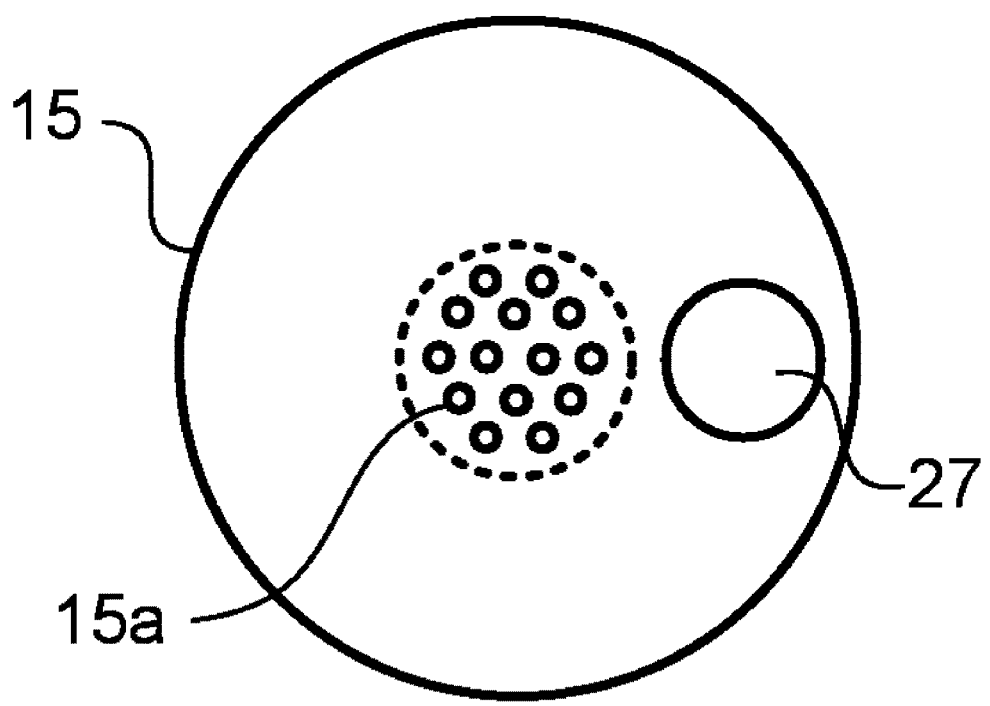
FIG. 4 is a view illustrating a top surface of a die.

For example, the die 15 shown in FIG. 4 may have at least one through hole 15a whose terminal cross section is in a circular shape. The molding material S passing through the die 15 and discharged is in a thin thread shape.

Figure 5:
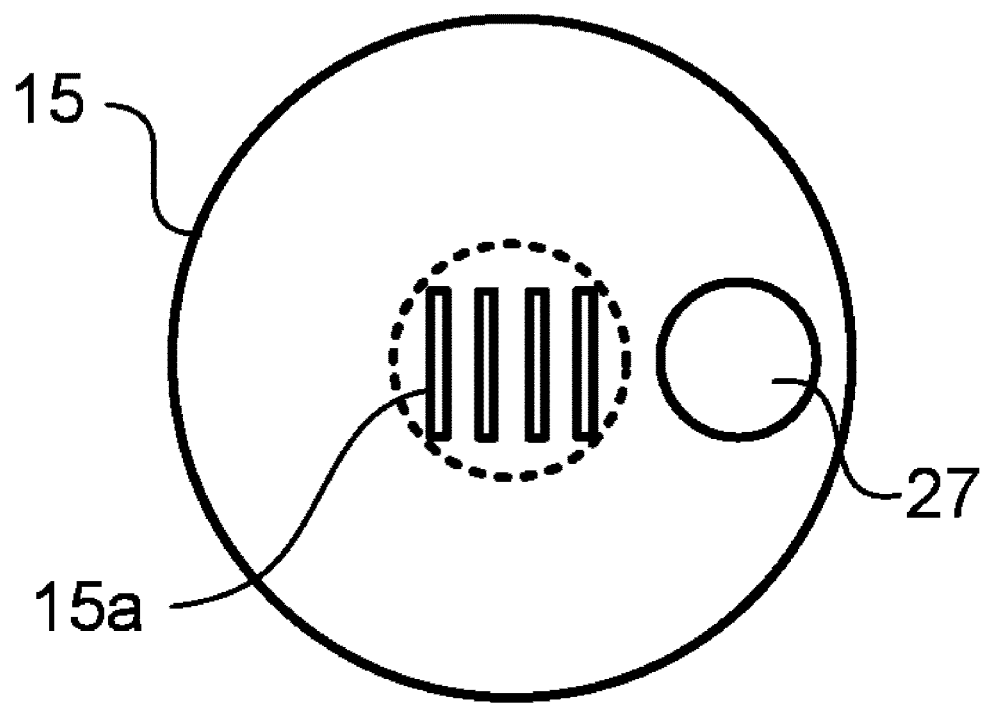
FIG. 5 is a view illustrating a top surface of a die according to another embodiment.

As another example, the die 15 shown in FIG. 5 may have at least one through hole 15a whose terminal cross section is in a rectangular shape. The molding material S passing through the die 15 and discharged is in a thin belt shape.

Figure 6:
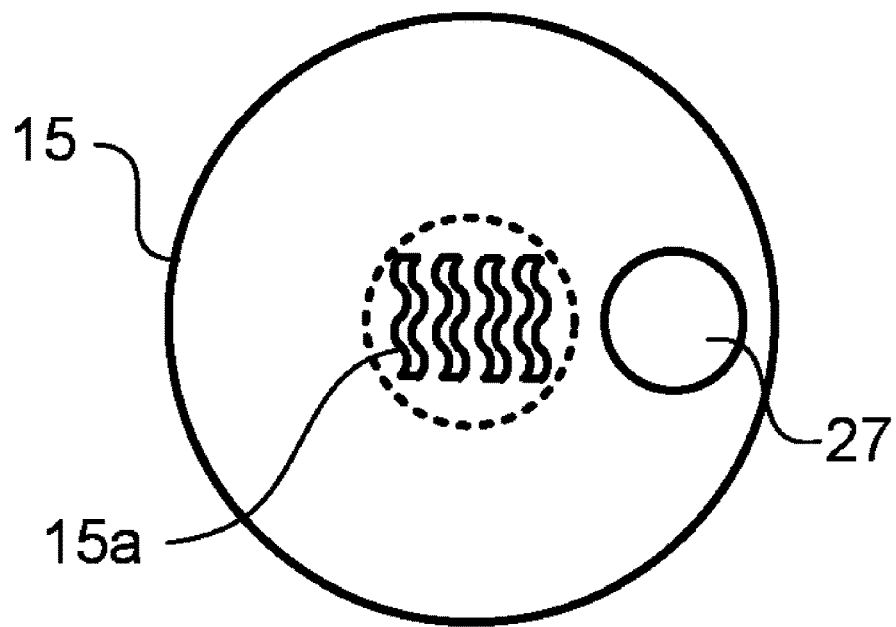
FIG. 6 is a view illustrating a top surface of a die according to another embodiment.

As yet another example, the die 15 shown in FIG. 6 may also have at least one through hole 15a whose terminal cross section is in a continuous S shape. The molding material S discharged through the die 15 is in a thin belt shape, and the cross section in a direction perpendicular to the longitudinal direction thereof is in a continuous S shape. In addition, the die 15 may have an adjustment member (not shown) capable of adjusting the size of the through hole 15a.

The molding material S passing through the through hole 15a of the die 15 is formed in a thin thread shape or a thin belt shape, etc., and has an increased surface area, and therefore easy to degas.

The second discharge device 3 includes a second discharge member 20, a second discharge driving device 21, and a second accommodation member 22.

The second discharge member 20 at least includes the first accommodation member 12 and the die 15.

The second discharge driving device 21 moves the second discharge member 20 back and forth. At this time, the second discharge driving device 21 is, for example, a pneumatic cylinder. As long as a necessary propulsion force or a necessary torque can be obtained, various driving sources, such as a hydraulic cylinder, a pneumatic cylinder, a linear motor, an electric motor, a hydraulic motor, or a pneumatic motor, can be adopted as the second discharge driving device 21.

The second accommodation member 22 is provided with the second accommodation space 23 and a second discharge hole 24. The second accommodation member 22 may also be configured by connecting a member in which the second accommodation space 23 is formed and a member in which the second discharge hole 24 is formed.

The second accommodation space 23 accommodates the second discharge member 20 to be movable back and forth. In addition, the second accommodation space 23 accommodates the molding material S discharged through the through hole 15a of the die 15 from the first accommodation space 13 at the front of the second discharge member 20. The molding material S accommodated in the second accommodation space 23 is formed in a thin thread shape or a thin belt shape, etc., by the die 15, and is easy to degas. In addition, by advancing the second discharge member 20, the molding material S in the second accommodation space 23 is extruded to the second discharge hole 24.

The second discharge hole 24 is in communication with the second accommodation space 23 of the second accommodation member 22 and the molding material supply port 101 of the molding apparatus 100. An inlet 24a of the second discharge hole 24 is open in the second accommodation space 24. An outlet 24b of the second discharge hole 24 is open to the outside of the second accommodation member 22. The outlet 24b of the second discharge hole 24 is connected to the molding material supply port 101 of the molding apparatus 100. The outlet 24b of the second discharge hole 24 and the molding material supply port 101 may be sealed by a seal member such as a packing (not shown).

In addition, the second discharge device 3 may be provided with at least one exhaust hole 25 which is in communication with the outside and the second accommodation space 23 and in which an exhaust port 25a is open to the second accommodation space 23. The exhaust hole 25 may be formed in one or both of the second discharge member 20 and the second accommodation member 22. The exhaust hole 25 discharge the gas degassed from the molding material S in the second accommodation space 23 to the outside of the second discharge device 3. In addition, the second accommodation space 23 and the second discharge member 20 may be sealed by a seal member such as a packing (not shown), so that the second discharge member 20 is slidable with respect to the second accommodation space 23.

In addition, the second discharge device 3 may also include an opening and closing valve 26 which opens and closes the exhaust hole 25. The opening and closing valve 26 prevents the molding material S from entering the exhaust hole 25 when the second discharge member 20 advances to extrude the molding material S in the second accommodation space 23 to the molding apparatus 100. For example, in the case where the exhaust hole 25 is formed in the second discharge member 20, the opening and closing valve 26 includes a valve body 27, an urging member 28 and a limiting member 29. The urging member 28 is disposed between the second discharge member 20 and the valve body 27, and generates an urging force in a direction in which the valve body 27 retreats with respect to the second discharge member 20. The limiting member 29 limits the valve body 27 from retreating over a limiting position with respect to the second accommodation member 22.

The valve body 27 may be retracted from the second accommodation space 23 by the urging force of the urging member 28 to close the exhaust port 25a when being movable with the second discharge member 20 with respect to the second accommodation member 22 in the front-rear direction, and may resist the urging force of the urging member 28 and protrude into the second accommodation space 23 to open the exhaust port 25a when staying at the limiting position and being relatively movable with respect to the second discharge member 20 in the front rear direction. The urging member 28 is a spring, for example. The opening and closing valve 26 may also be opened and closed by a driving source connected to the control device 4.

In addition, the molding material supply device 1 may also include a decompression device 5. The decompression device 5 and the second accommodation space 23 may be connected by the exhaust hole 25. The decompression device 5 decompresses the air pressure of the second accommodation space 23, and further facilitates the degassing of the molding material S accommodated in the second accommodation space 23. The decompression device 5 is, for example, a vacuum pump, etc.

Figure 7:
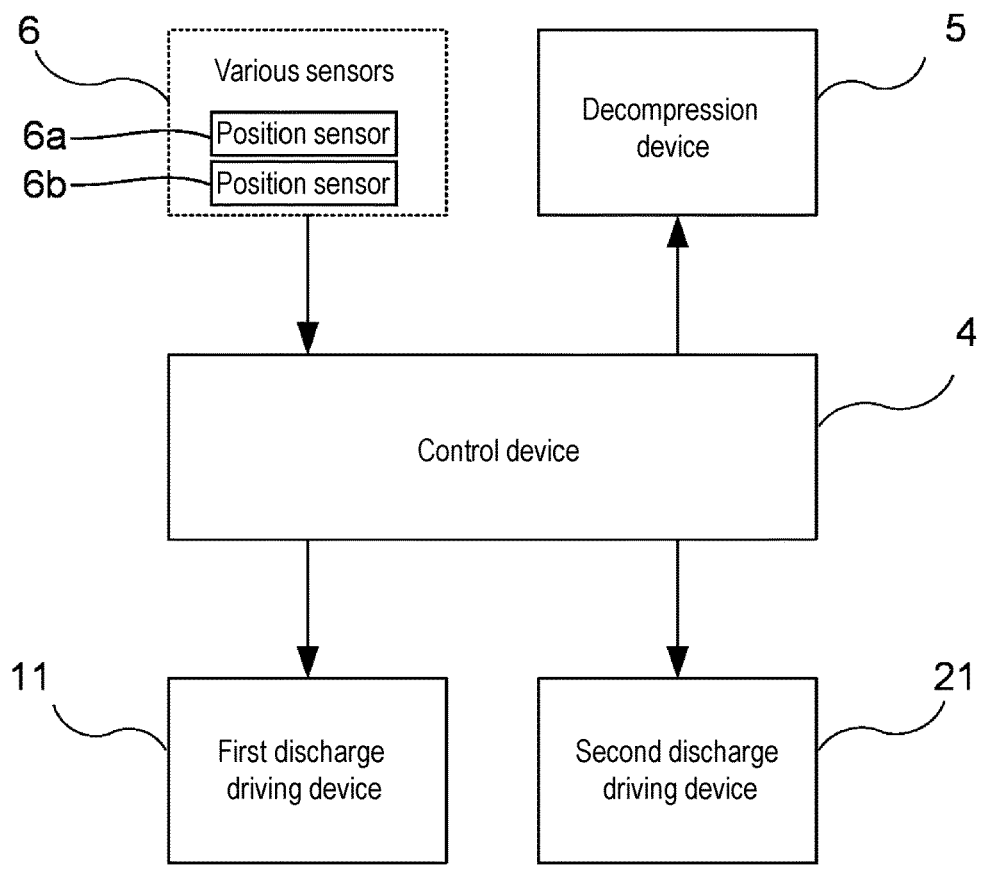
FIG. 7 is a block diagram illustrating a relationship between a control device and other configuration components connected to the control device.

As shown in FIG. 7, the control device 4 is connected to the first discharge driving device 11 and the second discharge driving device 21. In addition, the control device 4, in correspondence with needs, is connected to various sensors 6, such as position sensors 6a and 6b.

The control device 4 controls the first discharge driving device 11 to drive the first discharge member 10 and discharges the molding material S in the first accommodation space 13 into the second accommodation space 23 through the die 15. In addition, if detecting that a predetermined amount of the molding material S is accommodated in the second accommodation space 23, the control device 4 controls the second discharge driving device 21 to advance the second discharge member 20 and discharge the molding material S degassed in the second accommodation space 23 to the molding apparatus 100 from the molding material supply port 101.

The amount of the molding material S accommodated in the second accommodation space 23 can be detected by the amount of the molding material S discharged by the first discharge device 2. For example, if the first discharge member 10 is the plunger 10a, the first accommodation member 12 is in a cylinder shape, and the first accommodation space 13 is a cylinder hole, the amount of the molding material S discharged by the first discharge device 2 can be detected based on the inner diameter of the cylinder hole and the advancing distance of the plunger 10a. The control device 4 can receive the output signal of the position sensor 6a detecting the position of the plunger 10a and detect the amount of the molding material S accommodated in the second accommodation space 23. The position sensor 6a is, for example, a linear encoder, a rotary encoder, etc.

In addition, the amount of the molding material S accommodated in the second accommodation space 23 may also be detected by the height of the molding material S accumulated in the second accommodation space 23.

In addition, as the preparation before discharging the molding material S into the second accommodation space 23, the control device 4 controls the second discharge driving device 21 to retreat the second discharge member 20 to a predetermined position and expand the volume of the second accommodation space 23, so that the predetermined amount of the molding material S can be accommodated. The control device 4 receives the output signal of the position sensor 6b detecting the position of the second discharge member 20 to retreat the second discharge member 20 to the predetermined position. The position sensor 6b is, for example, a linear encoder, a rotary encoder, etc.

In addition, as shown in FIG. 7, the control device 4 may also be connected to the decompression device 5. The control device 4 may control the decompression device and decompress the air pressure in the second accommodation space 23 at a predetermined timing.

For example, when the molding material S in the first accommodation space 13 is being discharged to the second accommodation space 23 through the die 15, the control device 4 may control the decompression device 5 and decompress the air pressure in the second accommodation space 23. As another example, the control device 4 may also control the decompression device 5 and decompress the air pressure in the second accommodation space 23 after the volume of the second accommodation space 23 is expanded to be able to accommodate the predetermined amount of the molding material S and until the molding material S in the first accommodation space 13 is discharged to the second accommodation space 23 through the die 15.

The control device 4 may also be connected to the main control device of the molding apparatus 100 and control the first discharge driving device 11, the second discharge driving device 21, and the decompression device 5 in correspondence with the output signal transmitted from the molding apparatus 100. For example, the control device 4 may control the second discharge driving device 21 and discharge the molding material S in the second accommodation space 23 to the molding material supply port 101 of the molding apparatus 100 to supply the degassed molding material S to the molding apparatus 100 in correspondence with the output signal from the main control device of the molding apparatus 100. As another example, the control device 4 may also stop supplying the molding material S from the molding material supply device 1 in correspondence with the output signal from the main control device of the molding apparatus 100. The control device 4 may also be included in the main control device of the molding apparatus 100.

The molding material supply device 1 according to the disclosure will be further described in detail according to the embodiment in the following.

The molding material S is, for example, rubber, etc. The molding material S is, for example, rubber before being vulcanized. Vulcanization may also be referred to as cross-linking. Vulcanization is, for example, mixing rubber with a vulcanizing material and heating the rubber mixed with the vulcanizing material. Also, in vulcanization, the rubber mixed with the vulcanizing material may also be heated and pressurized. The elasticity and durability of the vulcanized rubber are greatly facilitated through forming a mesh-like linking structure in which molecules are linked. Here, the rubber before vulcanization is, for example, in a state of being mixed with the vulcanizing material but in a state of not being heated yet. At this time, the rubber before vulcanization may be supplied, in the state of being mixed with the vulcanizing material, to the molding apparatus 100, filled into the mold m by the molding apparatus 100, and heated in the mold m to be vulcanized. In addition, the rubber before vulcanization may also refer to the state before being mixed with the vulcanizing material. At this time, the rubber before vulcanization may also be supplied to the molding apparatus 100, mixed with the vulcanizing material in the molding apparatus 100, then filled into the mold m by the molding apparatus 100, and then heated in the mold m to be vulcanized.

The rubber is, for example, natural rubber, synthetic rubber or silicone rubber. The silicone rubber is millable type silicone rubber. The millable type silicone rubber before being vulcanized is similar to the state of natural rubber before being vulcanized or the state of synthetic rubber before being vulcanized, and is in a state of being able to be mixed, kneaded, or plasticized by a roll machine for rubber kneading, etc.

As shown in FIG. 1, the first discharge member 10 is the plunger 10a. The second discharge member 20 is configured by the first accommodation member 12 and the die 15. When the plunger 10a advances in the first accommodation space 13, the volume of the first accommodation space 13 is reduced. When the plunger 10a retreats in the first accommodation space 13, the volume of the first accommodation space 13 is expanded. When the second discharge member 20 advances in the second accommodation space 23, the volume of the second accommodation space 23 is reduced. When the second discharge member 20 retreats in the second accommodation space 23, the volume of the second accommodation space 23 is expanded.

The first accommodation member 12 is in a cylinder shape. The front portion of the cylinder hole of the first accommodation member 12 is the first discharge hole 14, and the rear portion thereof is the first accommodation space 13.

The first accommodation space 13 is open to the rear end of the first accommodation member 12. The plunger 10a is inserted into the first accommodation space 13 from an opening part 13a of the first accommodation space 13 open to the rear end of the first accommodation member 12. After the plunger 10a is pulled out from the first accommodation space 13, the molding material S is supplied into the first accommodation space 13 from the opening part 13a of the first accommodation space 13 open to the rear end of the second accommodation member 12.

As shown in FIG. 3, the supply hole 212 open to the outer periphery of the first accommodation member 12 and in communication with the first accommodation space 13 may also be formed. By simply retreating the plunger 10a behind the supply hole 212 without pulling out the plunger 10a, the molding material S can be supplied into the first accommodation space 13 from the supply hole 212.

The inlet 14a of the first discharge hole 14 is open to the first accommodation space 13. The outlet 14b of the first discharge hole 14 is open to the front end of the first accommodation member 12.

The die 15 is installed to the front end of the first accommodation member 12. The die 15 covers the outlet 14b of the first discharge hole 14. The at least one through hole 15a formed in the die 15 is in communication with the first discharge hole 14 and the second accommodation space 23. As shown in FIG. 2, for example, it may also be that the die 15 is configured by a die main body 15b in which the through hole 15a is formed and a die installation member 15c detachable from the die main body 15b, and the die installation member 15c to which the die main body 15b is installed is installed to the front end of the first accommodation member 12.

The plunger 10a is connected to a driving shaft of the first discharge driving device 11 to move back and forth. The first discharge driving device 11 is a hydraulic cylinder.

The second accommodation member 22 is in a cylinder shape. The front portion of the cylinder hole of the second accommodation member 22 is the second discharge hole 24, and the rear portion thereof is the second accommodation space 23.

The second accommodation space 23 is open to the rear end of the second accommodation member 22. The molding material S and the second discharge member 20 are accommodated from an opening part 23a open to the rear end of the second accommodation member 22.

The inlet 24a of the second discharge hole 24 is open to the second accommodation space 23. The outlet 24b of the second discharge hole 24 is open to the front end of the second accommodation member 22 and is connected to the molding material supply port 101 of the molding apparatus 100. The front end of the second accommodation member 22 is installed to the molding apparatus 100.

The second discharge member 20 is connected to a driving shaft of the second discharge driving device 21 to move back and forth. The second discharge driving device 21 is a pneumatic cylinder.

The exhaust hole 25 is formed in the second discharge member 20. The opening and closing valve 26 opening and closing the exhaust hole 25 is disposed at the front end of the second discharge member 20. The valve body 27 of the opening and closing valve 26 is provided with at least a portion of the exhaust hole 25 and the exhaust port 25a. The valve body 27 is disposed in the second discharge member 20 to be movable back and forth. The limiting member 29 has a pin member 29a and a hook member 29b. The pin member 29a is installed to the second accommodation member 22. The rear end part of the hook member 29b is installed to the valve body 27. The front end part of the hook member 29b is hooked to the pin member 29a when the valve body 27a retreats to the limiting position with respect to the second accommodation member 22. The limiting member 29 moves with the valve body 27, and when the valve body 27 retreats with respect to the second accommodation member 22, the limiting member 29 limits the valve body 27 from retreating over the limiting position with respect to the second accommodation member 22 by hooking the hook member 29b to the pin member 29a.

When the second discharge member 20 retreats to the predetermined position with respect to the second accommodation member 22 to accommodate the predetermined amount of the molding material S in the second accommodation space 23, the valve body 27 protrudes. The predetermined position is, for example, the position which the second discharge member 20 maximally retreats without being pulled out. The limiting position is set to be ahead of the predetermined position. The valve body 27 may protrude into the second accommodation space 23 from the front end of the second discharge member 20 right before the retreating second discharge member 20 arrives at the predetermined position, and may be retracted to the front end of the second discharge member 20 from the second accommodation space 23 right after the second discharge member 20 starts advancing from the predetermined position.

The exhaust port 25a is formed on the outer peripheral surface of the valve body 27, open to the second accommodation space 23 when the valve body 27 protrudes, and blocked when the valve body 27 is pushed back.

In the following, the molding material supply method according to the disclosure will be described.

Figure 8:
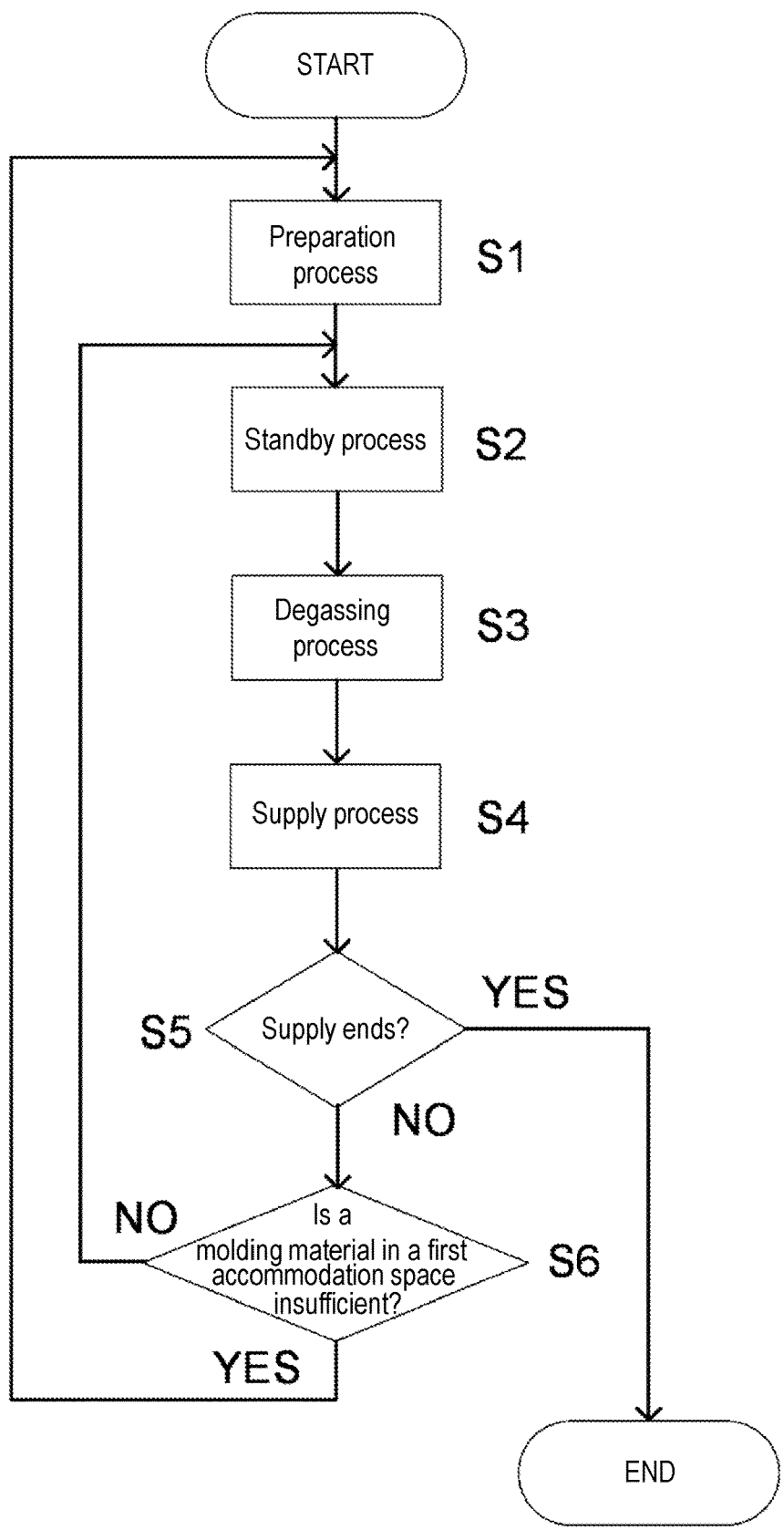
FIG. 8 is a flowchart illustrating a molding material supply method according to an embodiment of the disclosure.

As shown in the flowchart of FIG. 8, the molding material supply method according to the disclosure at least includes a preparation process S1, a standby process S2, a degassing process S3, and a supply process S4.

The preparation process S1 is a process in which the molding material S including the gas G is supplied to the first accommodation space 13 of the first accommodation member 12.

The standby process S2 is a process in which the second discharge member 20 retreats to the predetermined position with respect to the second accommodation member 22. In addition, in the standby process, the air pressure in the second accommodation space 23 may be decompressed by the decompression device 5 after the second discharge member 20 retreats.

The degassing process S3 is a process in which the first discharge member 10 is driven to discharge the molding material S in the first accommodation space 13 into the second accommodation space 23 and to the front of the second discharge member 20 through the through hole 15a of the die 15. In addition, in the degassing process, the air pressure in the second accommodation space 23 may also be decompressed by the decompression device 5.

The supply process S4 is a process in which the second discharge member 20 advances to discharge the molding material S after being degassed from the second accommodation space 23 to the molding material supply port 101 of the molding apparatus 100.

In the case where the amount of the molding material S dischargeable from the first accommodation space 13 is less than the amount of the molding material S required in the next degassing process S3, the processes are executed in the order of the preparation process S1, the standby process S2, the degassing process S3, and the supply process S4.

In the case where the amount of the molding material S dischargeable from the first accommodation space 13 is equal to or more than the amount of the molding material S required in the next degassing process S3, the processes are executed in the order of the standby process S2, the degassing process S3, and the supply process S4.

The molding material supply method according to the disclosure will be further described in detail according to the embodiment in the following The molding material S is, for example, rubber, etc. The molding material S is, for example, rubber before being vulcanized. The rubber is, for example, natural rubber, synthetic rubber or silicone rubber. The silicone rubber is millable type silicone rubber. The millable type silicone rubber before being vulcanized is similar to the state of natural rubber before being vulcanized or the state of synthetic rubber before being vulcanized, and is in a state of being able to be mixed, kneaded, or plasticized by a roll machine for rubber kneading, etc.

The first discharge member 10 is the plunger 10a. The second discharge member 20 is configured by the first accommodation member 12 and the die 15.

Figure 9:
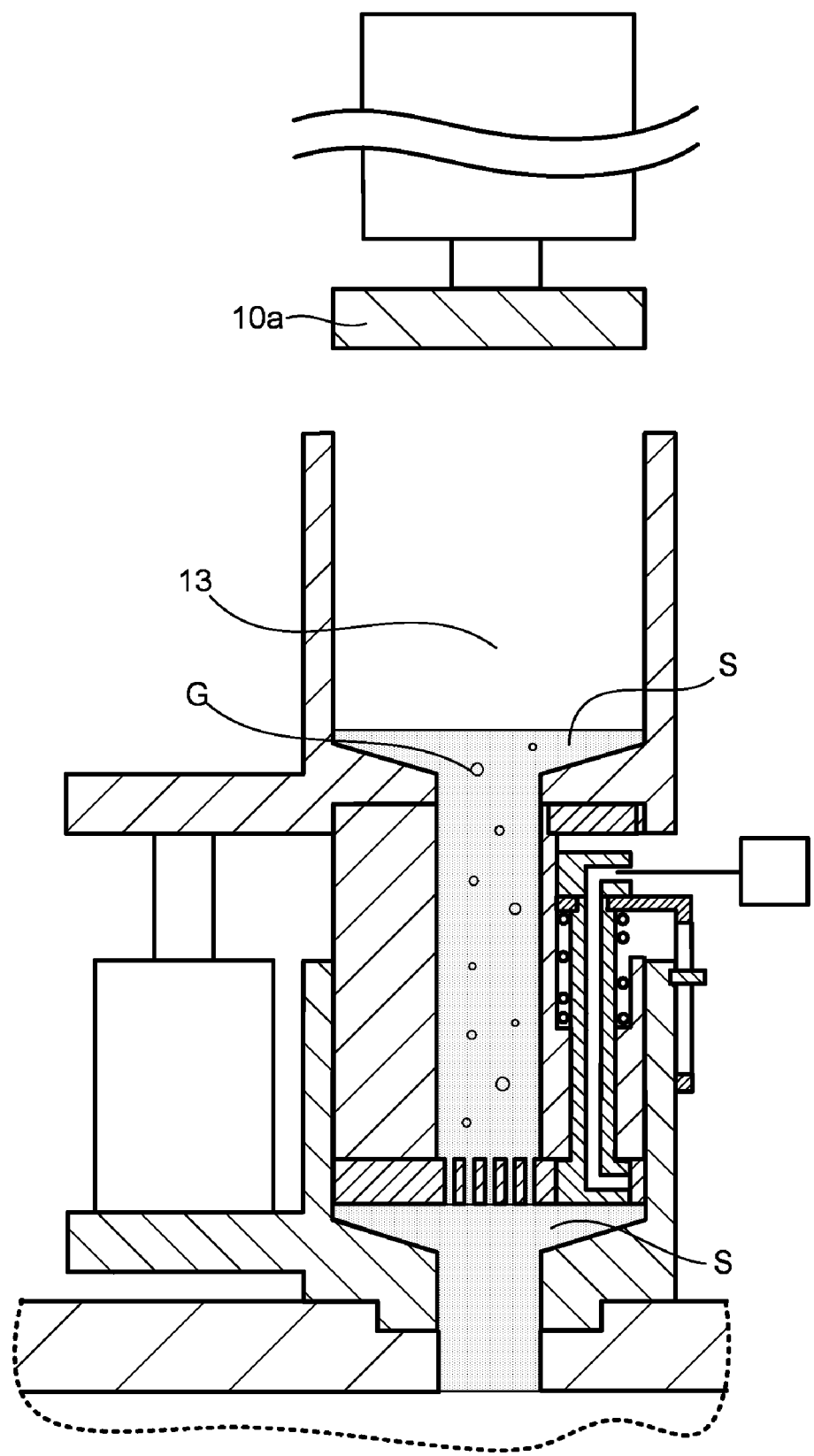
FIG. 9 is a view illustrating the molding material supply device according to an embodiment of the disclosure when a plunger is pulled out from a first accommodation space in a preparation process.
Figure 10:
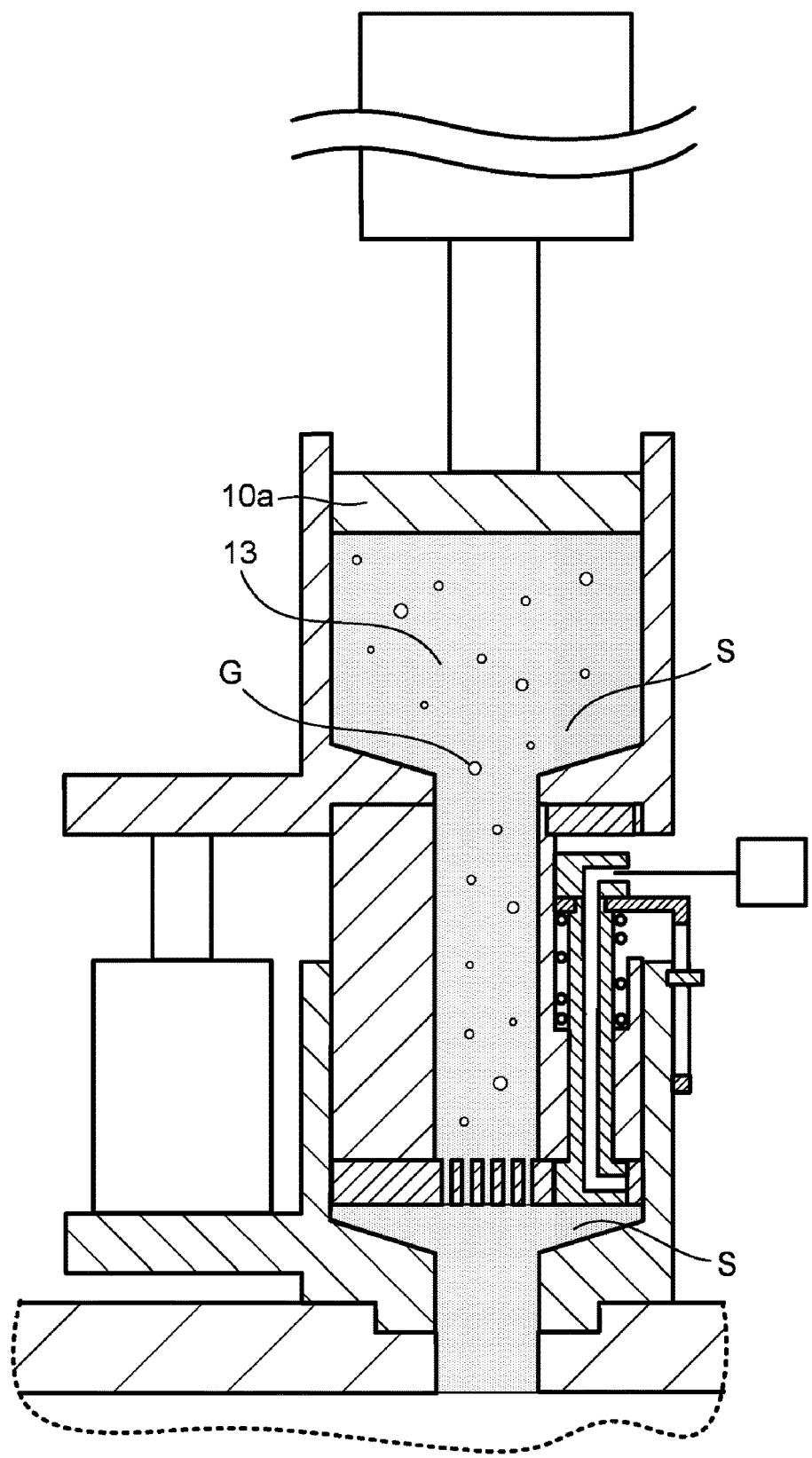
FIG. 10 is a view illustrating the molding material supply device according to an embodiment of the disclosure when a molding material is supplied to the first accommodation space in the preparation process.

Firstly, the preparation process S1 is executed. As shown in FIG. 9, the plunger 10a retreats to be pulled out from the first accommodation space 13. As shown in FIG. 10, the molding material S is supplied to the first accommodation space 13 after the plunger 10a is pulled out. After the molding material S is accommodated in the first accommodation space 13, the plunger 10a advances and is inserted into the first accommodation space 13. However, the molding material S in the first accommodation space 13 has not been discharged into the second accommodation space 23.

Figure 11:
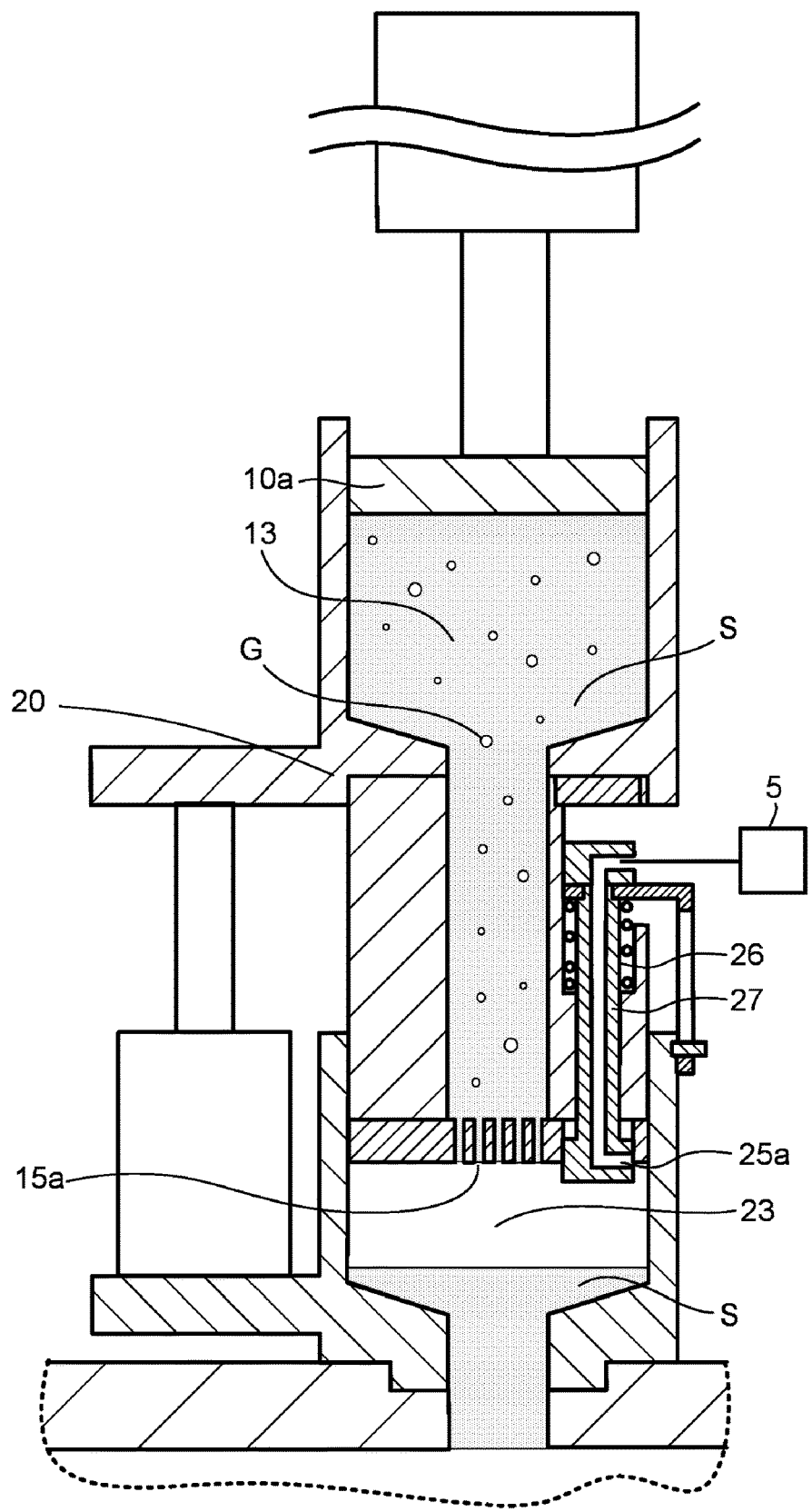
FIG. 11 is a view illustrating the molding material supply device according to an embodiment of the disclosure when a second discharge member is retreating to open an opening and closing valve in a standby process.
Figure 12:
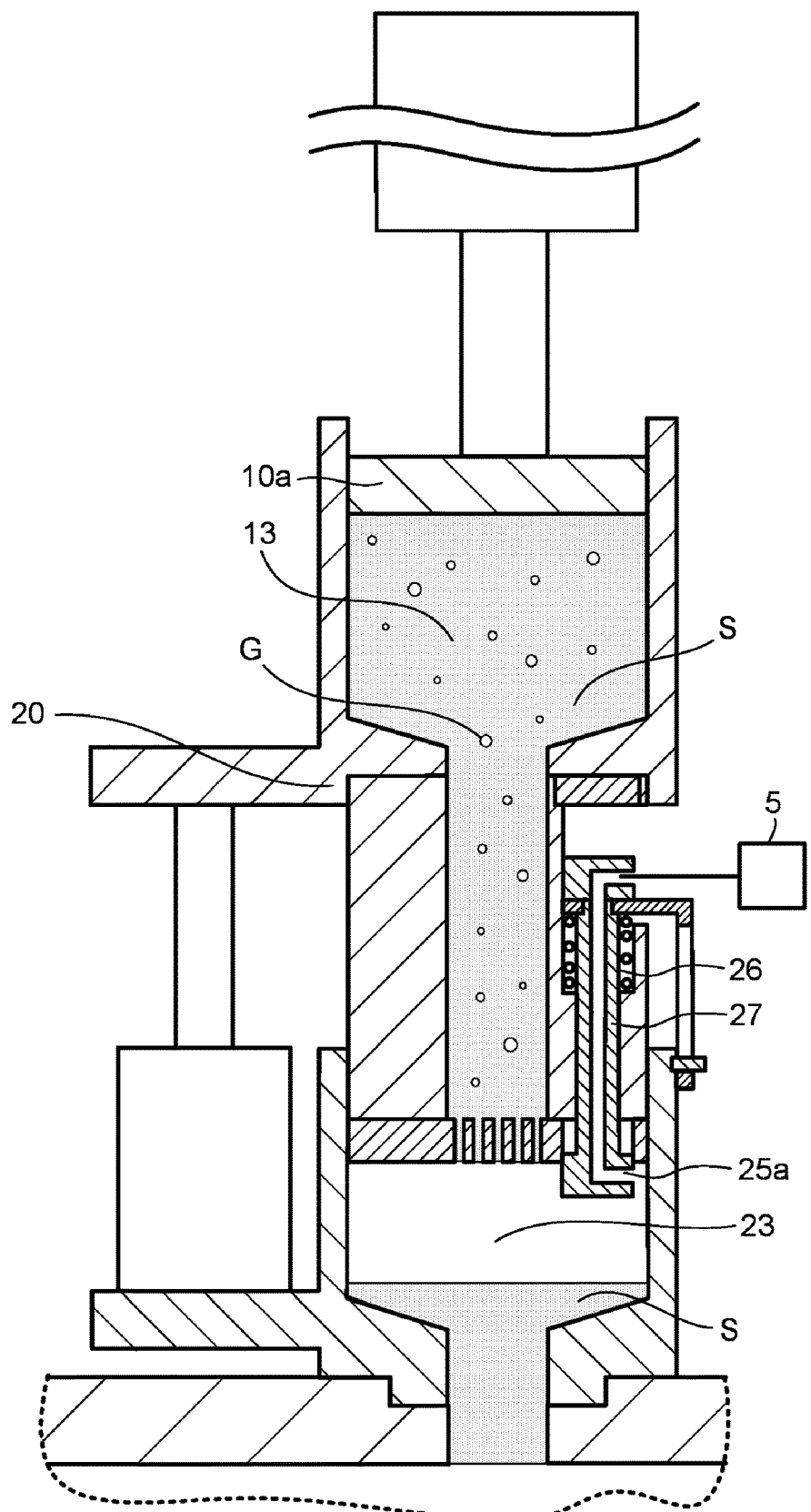
FIG. 12 is a view illustrating the molding material supply device according to an embodiment of the disclosure when the second discharge member further retreats to a predetermined position in the standby process.

Then, the standby process S2 is executed. As shown in FIGS. 11 and 12, with the second discharge member 20 retreating, the volume of the second accommodation space 23 is expanded. As shown in FIG. 11, the valve body 27 of the opening and closing valve 26 starts to protrude into the second accommodation space 23 right before the second discharge member 20 finishes retreating. As shown in FIG. 12, in order to accommodate the predetermined amount of the molding material S in the second accommodation space 23, the second discharge member 20 retreats to the predetermined position. The predetermined position is, for example, the position which the second discharge member 20 maximally retreats without being pulled out. At this time, the volume of the second accommodation space 23 is the maximum. In addition, at this time, since the valve body 27 of the opening and closing valve 26 protrudes into the second accommodation space 23 from the front end of the second discharge member 20, the exhaust port is opened. The air pressure of the second accommodation space 23 is decompressed by the decompression device 5.

Figure 13:
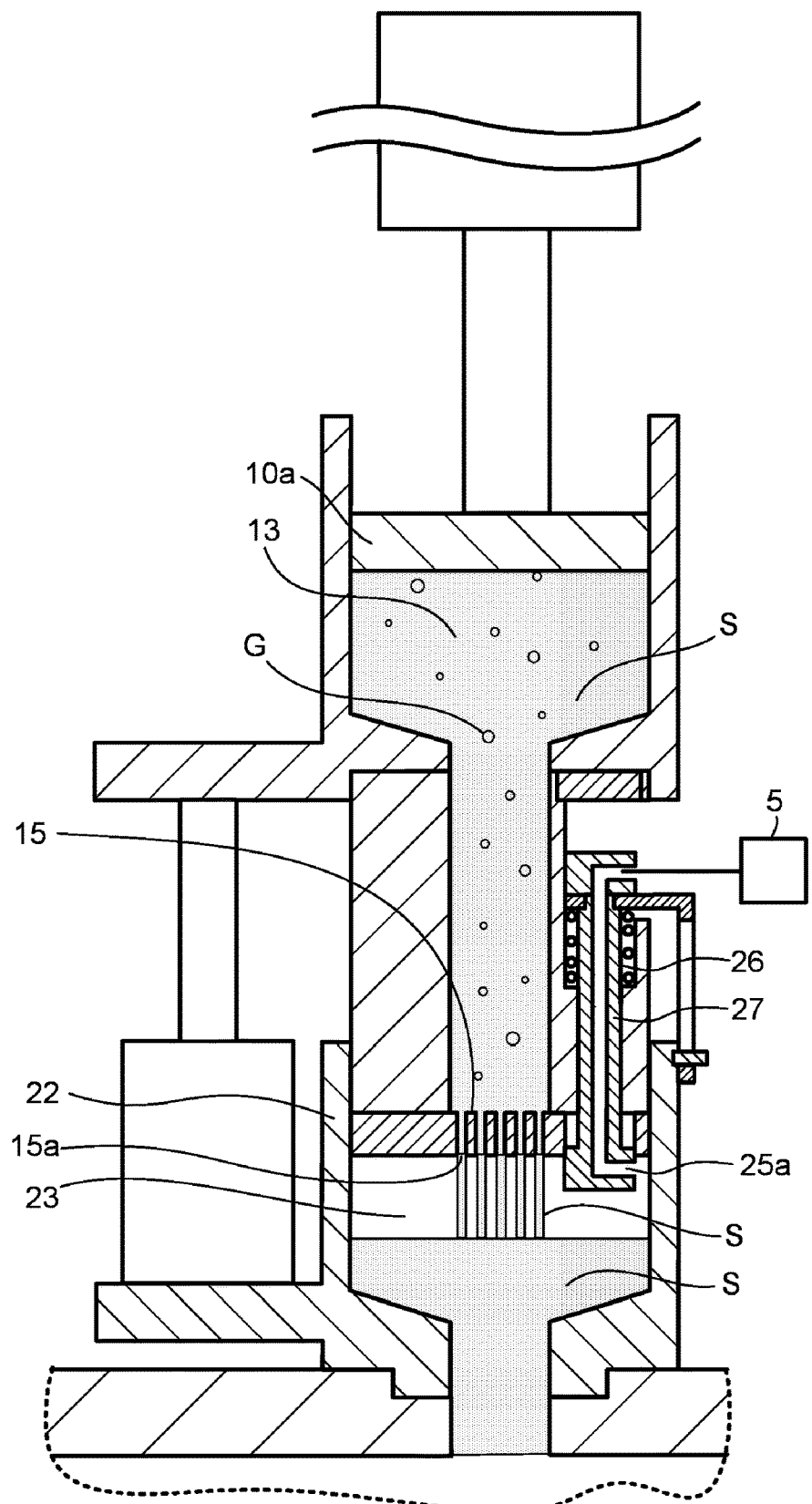
FIG. 13 is a schematic view illustrating a the molding material supply device according to an embodiment of the disclosure during a degassing process.

Then, the degassing process S3 is executed. As shown in FIG. 13, in order to discharge the predetermined amount of the molding material S in the first accommodation space 13 into the second accommodation space 23, the plunger 10a advances a predetermined distance. At this time, the molding material S in the first accommodation space 13 is discharged into the second accommodation space 23 through the through hole 15a of the die 15. The molding material S in the second accommodation space 23 is formed into a shape that is easy to degas, such as a thread shape or a belt shape. In addition, at this time, since the valve body 27 of the opening and closing valve 26 protrudes into the second accommodation space 23, the exhaust port 25a is opened. The air pressure of the second accommodation space 23 is decompressed by the decompression device 5. The molding material S in the second accommodation space 23 is degassed.

Figure 14:
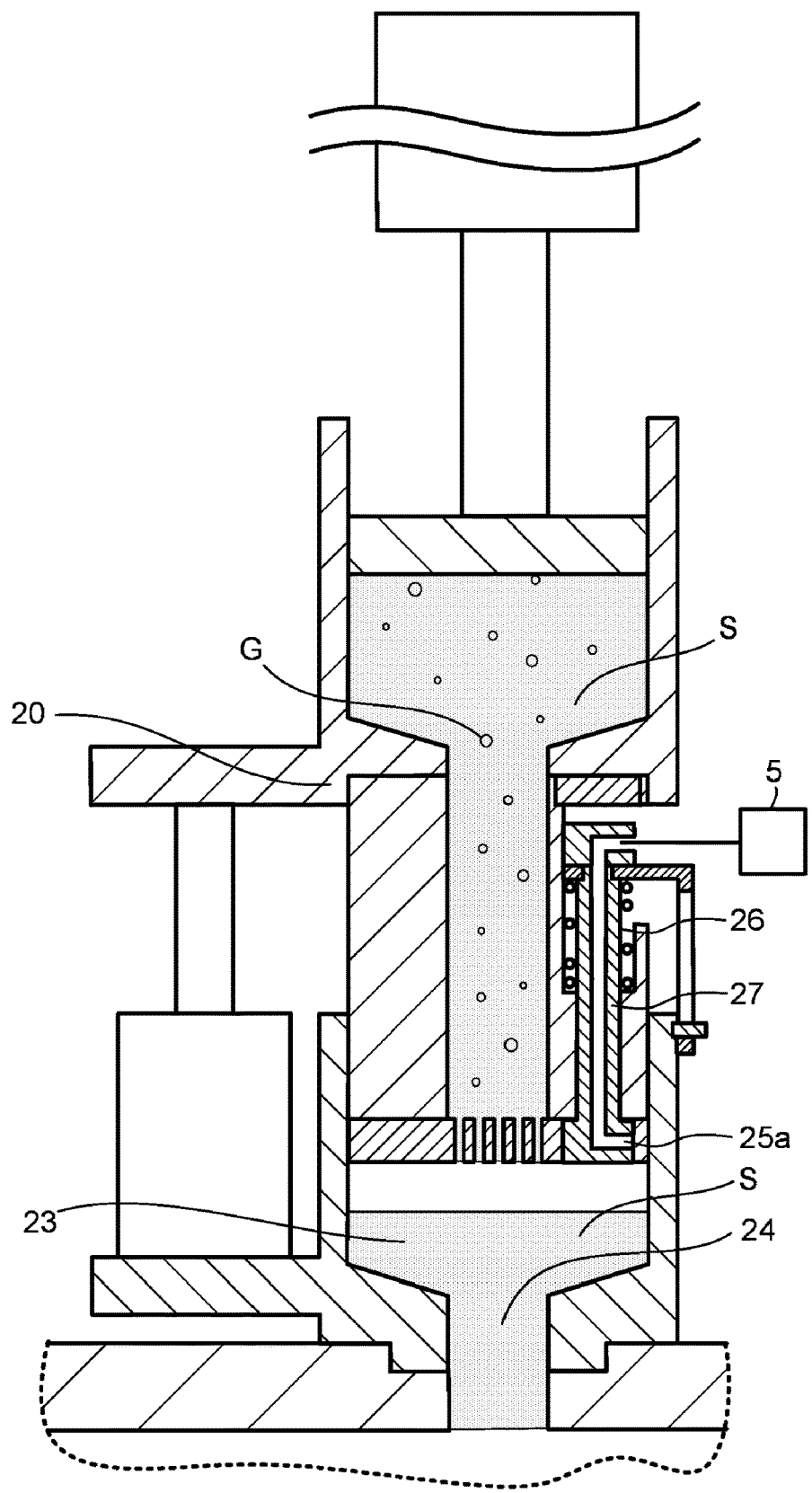
FIG. 14 is a view illustrating the molding material supply device according to an embodiment of the disclosure when the second discharge member advances to close the opening and closing valve in a supply process.
Figure 15:
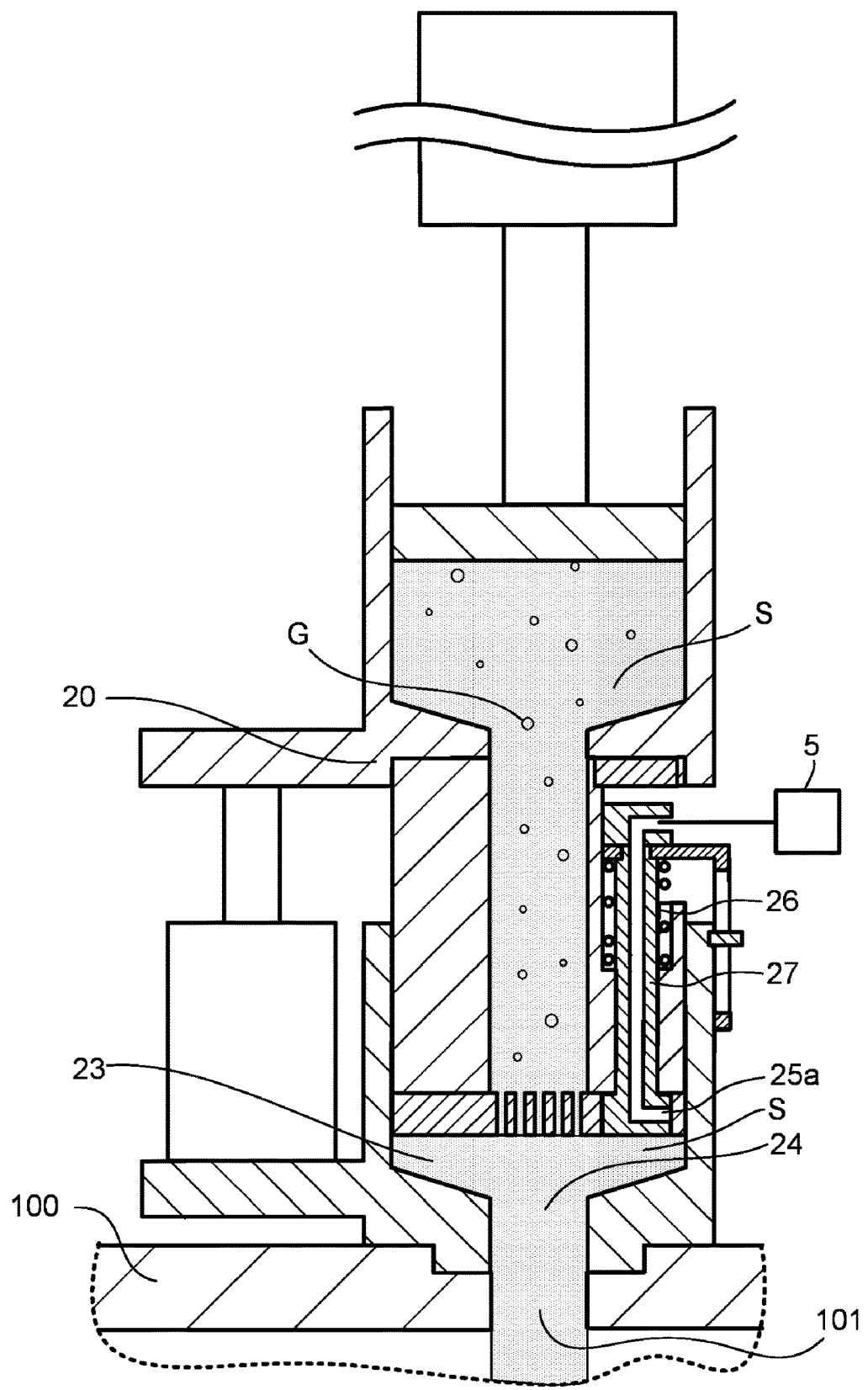
FIG. 15 is a view illustrating the molding material supply device according to an embodiment of the disclosure when the second discharge member further advances to supply the molding material to a molding apparatus.

Then, the supply process S4 is executed. As shown in FIGS. 14 and 15, to discharge the molding material S in the second accommodation space 23 from the second discharge hole 24, the second discharge member 20 advances. As shown in FIG. 14, the valve body 27 of the opening and closing valve 26 starts to be retracted from the second accommodation space 23 right after the second discharge member 20 starts advancing, and the valve body 27 is completely retracted from the second accommodation space 23 before the second discharge member 20 abuts against the molding material in the second accommodation space 23. As shown in FIG. 15, in order to discharge the molding material S in the second accommodation space 23 to the molding material supply port 101 of the molding apparatus 100, the second discharge member 20 advances the predetermined distance. The degassed molding material S is supplied to the molding apparatus 100. At this time, since the valve body 27 of the opening and closing valve 26 blocks the exhaust port 25a, the molding material S is prevented from entering the exhaust hole 25. In addition, since the exhaust port 25a is blocked, the second accommodation space 23 is not decompressed by the decompression device 5.

After the supply process S4 is completed, whether a series of processes are repetitively executed is determined (S5).

In the case of repeating a series of processes, whether the preparation process S1 is executed is determined (S6) in correspondence with the residual amount of the molding material S in the first accommodation space S1.

In order to discharge the predetermined amount of the molding material S in the first accommodation space 13 into the second accommodation space 23, in the case where the plunger 10a does not exceed the advanceable limiting position when the plunger 10a advances the predetermined distance, the standby process S2, the degassing process S3, and the supply process S4 are repeated in order.

In order to discharge the predetermined amount of the molding material S in the first accommodation space 13 into the second accommodation space 23, in the case where the plunger exceeds the advanceable limiting position when the plunger 10a advances the predetermined distance, the preparation process S1 is executed, and then the standby process S2, the degassing process S3, and the supply process S4 are repeated in order.

There is a case where the maximum amount of the molding material S which can be supplied by the molding material supply apparatus 1 to the molding apparatus 100 in one supply process S4 is less than the amount of the molding material S required by the molding apparatus 100 for one molding. The molding material supply device 1 may repeat a series of processes for multiple times until the molding apparatus 100 measures the amount of the molding material S required for one molding. For example, the control device 4 of the molding material supply device 1 may repeat a series of processes until the main control device of the molding apparatus 100 outputs a measurement completion signal.

The disclosure described above can be carried out in various other forms without departing from the spirit and essential characteristics of the disclosure. The disclosure described above can be carried out on liquid silicone rubber, thermosetting resin materials, or thermoplastic resin materials, etc., as the molding material S, without departing from the spirit and essential characteristics of the disclosure. The disclosure described above can be carried out in various other forms, such as various other molding materials S, without departing from the spirit and essential characteristics of the disclosure. Therefore, the examples described herein are exemplary and should not be construed as limitations on the disclosure.

The embodiment was chosen in order to explain the principles of the disclosure and its practical application. Many modifications and variations are possible in light of the above teachings. It is intended that the scope of the disclosure be defined by the claims.

What is claimed is:

1. A molding material supply device, degassing gas mixed into a molding material and supplying the degassed molding material to a molding material supply port of a molding apparatus, the molding material supply device comprising: a first discharge device, a second discharge device, and a control device, wherein the first discharge device comprises: a first discharge member, a first discharge driving device, a first accommodation member, and a die;

the first discharge driving device drives the first discharge member;

the first accommodation member is provided with a first accommodation space accommodating the first discharge member to be able to drive the first discharge member and accommodating the molding material, and provided with a first discharge hole in communication with the first accommodation space and the die;

the die is installed to the first discharge hole and is provided with at least one through hole in communication with the first discharge hole and an outside of the first accommodation member;

the second discharge device comprises: a second discharge member, a second discharge driving device, and a second accommodation member;

the second discharge member at least comprises the first accommodation member and the die;

the second discharge driving device moves the second discharge member back and forth;

the second accommodation member is provided with a second accommodation space accommodating the second discharge member to be movable back and forth and accommodating the molding material discharged through the die to a front of the second discharge member, and provided with a second discharge hole in communication with the second accommodation space and the molding material supply port; and the control device is connected to the first discharge driving device and the second discharge driving device, controls the first discharge driving device to drive the first discharge member to discharge the molding material in the first accommodation space into the second accommodation space through the die, and controls the second discharge driving device to advance the second discharge member to discharge the molding material having been degassed in the second accommodation space into the molding apparatus from the molding material supply port.

2. The molding material supply device as claimed in claim 1, wherein the second discharge device is provided with at least one exhaust hole which is in communication with an outside and the second accommodation space and in which an exhaust port is open to the second accommodation space.

3. The molding material supply device as claimed in claim 2, wherein the exhaust hole is formed in the second discharge member,
the second discharge member comprises an opening and closing valve which opens and closes the exhaust hole,
the opening and closing valve comprises an urging member, a limiting member, and a valve body,
the urging member is disposed between the second discharge member and the valve body, and generates an urging force in a direction in which the valve body retreats with respect to the second discharge member,
the limiting member limits the valve body from retreating over a limiting position with respect to the second accommodation member, and
the valve body is retracted from the second accommodation space by the urging force to close the exhaust port when being movable with the second discharge member with respect to the second accommodation member in a front-rear direction, and resists the urging force and protrudes into the second accommodation space to open the exhaust port when staying in the limiting position and being relatively movable with respect to the second discharge member in the front-rear direction.

4. The molding material supply device as claimed in claim 2, comprising a decompression device, wherein the exhaust hole is connected to the second accommodation space and the decompression device, and the decompression device decompresses an air pressure in the second accommodation space.

5. The molding material supply device as claimed in claim 4, wherein the control device is connected to the decompression device, and at least when the molding material in the first accommodation space is being discharged to the second accommodation space through the die, the control device controls the decompression device and decompresses the air pressure in the second accommodation space.

6. The molding material supply device as claimed in claim 1, wherein the control device controls the second discharge driving device to retreat the second discharge member to a predetermined position before the molding material is discharged into the second accommodation space.

7. The molding material supply device as claimed in claim 1, wherein the first discharge member is a plunger,
the first discharge driving device moves the plunger back and forth, and
the first accommodation space accommodates the plunger to be movable back and forth, and accommodates the molding material to a front of the plunger.

8. The molding material supply device as claimed in claim 1, wherein the first discharge member is a screw,
the first discharge driving device rotates the screw, and
the first accommodation space accommodates the screw to be rotatable.

9. The molding material supply device as claimed in claim 1, wherein the molding apparatus is an injection molding apparatus,
the molding material supply port is formed in a plasticizing cylinder accommodating a plasticizing screw, a mixing cylinder accommodating a mixing screw, an injection cylinder accommodating an in-line screw, or an injection cylinder accommodating a plunger.

10. The molding material supply device as claimed in claim 1, wherein the molding material is millable type silicone rubber.

11. A molding material supply method, degassing gas mixed into a molding material and supplying the degassed molding material to a molding material supply port of a molding apparatus, the molding material supply method comprising:
a preparation process in which the molding material is supplied to a first accommodation space of a first accommodation member;
a standby process in which a second discharge member at least configured by the first accommodation member and a die and accommodated in a second accommodation space of a second accommodation member to be movable back and forth retreats to a predetermined position with respect to the second accommodation member;
a degassing process in which a first discharge member accommodated in the first accommodation space to be drivable is driven to discharge the molding material in the first accommodation space into the second accommodation space and to a front of the second discharge member through a through hole of the die; and
a supply process in which the second discharge member advances to discharge the molding material after being degassed from the second accommodation space to the molding material supply port.

12. The molding material supply method as claimed in claim 11, wherein in the degassing process, an air pressure in the second accommodation space is decompressed by a decompression device.

13. The molding material supply method as claimed in claim 11, wherein in the standby process, an air pressure in the second accommodation space is decompressed by a decompression device after the second discharge member retreats to the predetermined position.

14. The molding material supply method as claimed in claim 11, wherein the molding material is millable type silicone rubber.

* * * * *